United States Patent [19]

Eck et al.

[11] Patent Number: 5,863,862
[45] Date of Patent: *Jan. 26, 1999

[54] PROCESS FOR THE MICROENCAPSULATION OF WATER-EMULSIFIABLE NON-THERMOPLASTIC SUBSTANCES

[75] Inventors: Herbert Eck; Heinrich Hopf; Gerald Fleischmann; Ernst Innertsberger, all of Burghausen; Jakob Schmidlkofer, Mehring, all of Germany

[73] Assignee: Wacker-Chemie GmbH, Germany

[*] Notice: The term of this patent shall not extend beyond the expiration date of Pat. No. 5,641,535.

[21] Appl. No.: 749,744

[22] Filed: Nov. 15, 1996

Related U.S. Application Data

[63] Continuation of Ser. No. 842,022, Feb. 26, 1992, Pat. No. 5,641,535.

[30] Foreign Application Priority Data

Mar. 14, 1991 [DE] Germany ............... 41 08 286.9
Sep. 25, 1991 [DE] Germany ............... 41 31 939.7

[51] Int. Cl.$^6$ ............... A01N 25/28; A61K 7/46; A23L 3/42; B01J 13/04
[52] U.S. Cl. .............. 504/116; 71/DIG. 1; 427/2.14; 427/213.3; 427/213.31; 427/231.36; 427/359; 264/4.1; 264/4.3; 264/4.33; 264/4.6; 426/98
[58] Field of Search ............ 264/4.1, 4.6, 4.3, 264/4.33; 427/2.14, 213.3, 213.36, 359, 212, 213.31; 428/402.2, 402.21, 402.22, 402.24; 424/461, 462, 494, 497; 106/820; 514/820; 512/4; 71/DIG. 1; 504/116; 426/98

[56] References Cited

U.S. PATENT DOCUMENTS

| | | | |
|---|---|---|---|
| 3,852,401 | 12/1974 | Suzuki et al. | 428/402.24 X |
| 3,968,277 | 7/1976 | Takase | 427/212 |
| 3,971,852 | 7/1976 | Brenner et al. | 512/4 X |
| 4,173,492 | 11/1979 | Pollard | 428/402.24 X |
| 4,285,983 | 8/1981 | Saldarini et al. | 427/212 X |
| 4,370,160 | 1/1983 | Ziemelis | 424/497 X |
| 4,515,769 | 5/1985 | Merritt et al. | 424/49 |
| 4,954,381 | 9/1990 | Cabasso et al. | 264/4.6 X |
| 5,087,649 | 2/1992 | Wegner et al. | 524/30 |
| 5,130,171 | 7/1992 | Prud'Homme et al. | 427/213.36 |
| 5,641,535 | 6/1997 | Eck et al. | 264/4.6 X |

FOREIGN PATENT DOCUMENTS

| | | | |
|---|---|---|---|
| 639730 | 4/1962 | Canada | 252/358 |

*Primary Examiner*—Richard D. Lovering
*Attorney, Agent, or Firm*—Brooks & Kushman P.C.

[57] ABSTRACT

The invention relates to a process for the preparation of microcapsulated flakes or powders by drying aqueous mixtures containing (a) one or more water-emulsifiable, non-thermoplastic compounds which have a higher boiling point than water and (b) at least one water-soluble, film-forming polymer, in which the content of component (a) is up to about 95% by weight, based on the dry weight of components (a) and (b), with the proviso that the water-soluble, film-forming polymer has a flocculation point of from 20° to 98° C. or the flocculation point is adjusted to from 20° to 98° C. with the aid of additives, and drying is carried out by thin-layer drying in a temperature range above the flocculation point.

5 Claims, No Drawings

PROCESS FOR THE MICROENCAPSULATION OF WATER-EMULSIFIABLE NON-THERMOPLASTIC SUBSTANCES

This application is a continuation of application Ser. No. 07/842,022, filed on Feb. 26, 1992, now U.S. Pat. No. 5,641,535.

The invention relates to a process for the microencapsulation of water-emulsifiable, non-thermoplastic substances having a boiling point higher than water, in which the microencapsulation is carried out using water-soluble polymers by means of thin-layer drying.

BACKGROUND OF THE INVENTION

GB-A 892,787 discloses a process for preparing powders comprising encapsulated organopolysiloxanes using a water-soluble polymer. The process is carried out by spray-drying an aqueous emulsion comprising the organopolysiloxane, the water-soluble polymer and a filler.

U.S. Pat. No. 3,210,208 describes a process for the preparation of organopolysiloxane-containing powders by spray-drying aqueous emulsions of the organopolysiloxanes containing film-forming polymers, such as polyvinyl alcohol or polyvinylpyrrolidone.

A process for the production of spray-dried powders comprising at least one organosilicon compound and a water-soluble polymer is also disclosed in EP-A 228657 (U.S. Pat No. 4,704,416).

EP-A 279373 describes a process for preparing water-redispersible powders by spray drying an organopolysiloxane and a water-soluble polymer having a cloud point of from 35° to 98° C.

Thus, it is an object of the present invention to provide a process for preparing microencapsulated flakes or powders which contain water-emulsifiable, non-thermoplastic substances having a higher boiling point than water. Another object of the present invention is to prepare microencapsulated flakes or powders which contain water-emulsifiable substances by a process which uses less energy than the spray-drying processes known heretofore and requires less complex equipment.

SUMMARY OF THE INVENTION

The foregoing objects and others which will become apparent from the following description are accomplished in accordance with this invention, generally speaking, by providing a process for preparing microencapsulated flakes or powders by drying aqueous mixtures containing (a) one or more water-emulsifiable, non-thermoplastic compounds which have a higher boiling point than water and (b) at least one water-soluble, film-forming polymer, in which component (a) is present in an amount up to 95% by weight, based on the dry weight of components (a) and (b), with the proviso that the water-soluble, film-forming polymer has a flocculation point of from 20° to 98° C. or the flocculation point is adjusted to from 20° to 98° C. with the aid of additives, and the drying step is carried out by thin-layer drying in a temperature range above the flocculation point.

DESCRIPTION OF THE INVENTION

The substances (a) to be encapsulated should be insoluble or slightly soluble in water and have a significantly higher boiling point than water. Their boiling point is preferably at least 150° C. under standard conditions and more preferable the process is particularly suitable for compounds (a) having a boiling point of at least 170° C. In addition, it is advantageous if the substance to be encapsulated can be emulsified in water under standard conditions, i.e., have a melting point of less than 100° C., preferably less than 60° C. If the melting point is>100° C., the emulsification must be carried out under pressure at the appropriate temperature. Using this process, it is not possible to produce redispersible powders from film-forming thermoplastics.

Specific examples of preferred compounds which can be encapsulated using the process of this invention are: organosilicon compounds of the formula $R_aSi(OR^1)_{4-a}$ or partial hydrolysates thereof, where R is a monovalent hydrocarbon radical which may contain at least one substituent which is optionally inert towards water at the particular drying conditions, $R^1$ represents the same or different alkyl or alkoxyalkylene radicals, in each case having 1 to 4 carbon atoms per radical, a is 0 to 4, and a boiling point of at least 150° C. at 1020 hPa (abs.).

Organopolysiloxanes, which on the average, have at least two Si—C-bonded organic radicals per silicon atom, some of which may be replaced by Si-bonded hydrogen may be employed in the process of this invention. Preferably organopolysiloxanes of the formula $R^3R_2SiO(SiR_2O)_nSiR_2R^3$ which, on the average, have at least two Si—C-bonded organic radicals per silicon atom, some of which may be replaced by Si-bonded hydrogen, where the radical R is the same or different monovalent hydrocarbon radicals which may contain a substituent that is optionally inert towards water at the particular drying conditions, or R is hydrogen may be employed, with the proviso that at least one hydrocarbon radical, preferably an alkyl radical having from 1 to 4 carbon atoms, and in particular a methyl radical, is also bonded to each silicon atom to which the hydrogen atom is bonded. The radical $R^3$ is the same as R or is —$OR^2$, where $R^2$ is a hydrogen atom or one of the hydrocarbon radicals having from 1 to 18 carbon atoms mentioned for R. The radical $R^2$ is preferably an alkyl radical having from 1 to 4 carbon atoms, and in particular a methyl radical and n is 0 or an integer. It is preferred that n have a value such that the organopolysiloxane has a kinematic viscosity of 5 $mm^2 \cdot s^{-1}$ to $10^5$ $mm^2 \cdot s^{-1}$ at 25° C. In the case of organopolysiloxanes which contain an average of at least two Si—C-bonded organic radicals per silicon atom, some of which may be replaced by Si-bonded hydrogen, and which contain no condensable groups, such as Si-bonded hydroxyl groups or alkoxy groups, other than the Si-bonded hydrogen, the kinematic viscosity is preferably up to 1000 $mm^2 \cdot s^{-1}$ at 25° C.

Organopolysiloxanes having units of the formula $R_cH_dSi(OR^1)_e(OH)_fO((4-c-d-e-f)/2)$ in which R and $R^1$ are the same as above, c is 0 to 3, preferably from 0 to 1.8; d is 0 to 1; e is 0 to 3, preferably from 0.01 to 2.0, and f is 0 to 3, preferably from 0.0 to 0.5; with the proviso that the sum of c+d+e+f is at most 3.5 per unit and the boiling point is at least 150° C. at 1020 hPa (abs.).

The organic radicals represented by R preferably contain at most 18 carbon atoms per radical, Examples of hydrocarbon radicals represented by R are alkyl radicals, such as the methyl, ethyl, n-propyl, isopropyl, butyl, hexyl and 2-ethylhexyl radical and the octadecyl radicals, radicals containing carbon-carbon double bonds, such as the vinyl, allyl, ethylallyl and butadienyl radical; cycloalkyl radicals having from 5 to 18 carbon atoms, such as the cyclohexyl radical or the methylcyclohexyl radicals; aryl radicals, such as the phenyl radical; alkaryl radicals, such as the tolyl radicals, and aralkyl radicals, such as the benzyl radical.

Examples of substituted hydrocarbon radicals represented by R are halogenated hydrocarbon radicals, such as the 3,3,3-trifluoropropyl radical and 3-chloropropyl radical and chlorophenyl radicals; mercaptoalkyl radicals, such as the 3-mercaptopropyl radical and acylaxyalkyl radicals, such as the 3-methacryloxypropyl radical.

Examples of alkyl radicals represented by $R^1$ are the methyl, ethyl, n-propyl, isopropyl, n-butyl, sec-butyl and tert-butyl radical. The preferred example of an alkoxyalkylene radical $R^1$ is the methoxyethylene radical.

Examples of suitable organosilicon compounds which can be used in the process of this invention in preparing the powders are silanes such as 3-mercaptopropyltrimethoxysilane, vinyltris(methoxyethyleneoxy)silane, 3-methacrylpropyltris(methoxyethyleneoxy)silane, n-octyltriethoxysilane and 2-ethylhexyltrimethoxysilane.

Examples of suitable organopolysiloxanes having the formula $R^3R_2SiO(SiR_2O)_nSiR_2R^3$ are dimethylpolysiloxanes which are terminally blocked by trimethylsiloxy groups, dimethyl-γ-aminopropyl, dimethyl-γ-hydroxypropyl, dimethyl-H- or dimethylvinyl groups, methylhydrogenpolysiloxanes units which are terminally blocked by trimethylsiloxy groups copolymers, containing dimethoxysilane and methylhydrogensiloxane units, which are end blocked with trimethylsiloxy groups, dimethylpolysiloxanes which are terminally blocked by dimethyl-H-siloxy groups, and dimethylpolysiloxanes having one Si-bonded hydroxyl group in each of the terminal units.

Examples of suitable organopolysiloxanes having units of the formula $R_cH_dSi(OR^1)_e(OH)_fO((4-c-d-e-f)/2)$ is an organopolysiloxane of the empirical formula $CH_3Si(OC_2H_5)_{0.8}O_{1.1}$ having an average molecular weight of about 600 g/mol and a viscosity of about 20 mm$^2 \cdot$s$^{-1}$ at 25° C., an organopolysiloxane of the empirical formula $CH_3Si(OCH_3)_{0.8}O_{1.1}$ having an average molecular weight of about 650 g/mol and a viscosity of about 30 mm$^2 \cdot$s$^{-1}$ at 25° C. an organopolysiloxane of the empirical formula $C_6H_5Si(OC_2H_5)_{072}O_{1.14}$ having an average molecular weight of about 3000 g/mol and a viscosity of about 25000 mm$^2 \cdot$s$^{-1}$ at 25° C., and an organopolysiloxane of the formula $R^2Si(OCH_3)_2O_{0.5}$ in which 70% of the $R^2$ radicals are methyl groups and 30% of the $R^2$ radicals are 2-ethylhexyl groups.

Organic and inorganic compounds which boil at>150° C., are insoluble or sparingly soluble in water, are fluid at below 80° C., and do not react or react sufficiently slowly with water under the operating conditions required are for example hydrocarbons such as paraffins, terpenes and fragrances; halogenated hydrocarbons; esters, such as, for example, dioctyl phthalate, dioctyl adipate and other plasticizers; ethers, such as oligo- and polypropylene glycols, alcohols, such as stearyl alcohols; amines, acids, diand polysilanes, carbosilanes, siloxane copolymers and polyethyl silicates.

Examples of suitable paraffins are alkenes, such as 1-decene. Examples of fragrances are 2,2-dimethyl-3-(3-methylphenyl)propanol, the 3-methyl-2-butenyl ester (prenyl ester) of acetic acid, benzoic acid and salicylic acid, ethyl acetoacetate and tetramethylperhydronaphtofuran. Examples of halogenated hydrocarbons are dichlorobenzenes, trichlorobenzenes and perchloroethane. Examples of amines are aniline, toluidines, dodecylamine and liquid polyamines. Examples of acids are caprylic, dodecyl and stearic acid.

Suitable di- and polysilanes are, for example, poly(cyclohexylmethyl)silanes, polydihexylsilanes, polydimethylsilanes, poly(octylmethyl)silanes, poly(phenylmethyl)silanes and isopropyl-methyl-n-propylmethylpolysilane. Examples of carbosilanes and siloxane copolymers are tetramethyldisiloxane-divinylbenzene copolymers, tetramethylsiloxane-ethylene copolymers, dimethylsiloxane-bisphenol A carbonate block copolymers, siloxane block copolymers with ethylene oxide and/or propylene oxide, with styrene, α-methylstyrene, acrylates, methacrylates oxazolines and other organic oligomers or polymers.

Suitable water-soluble, film-forming polymers for microencapsulation of the above compounds are those which have a flocculation point of from 20° to 98° C. or those in which a flocculation point of from 20° to 98° C. can be produced by adding additives, such as salts or inert solvents. In particular if the water-soluble polymers contain substituents which are capable of salt formation, the flocculation point can also be adjusted to the desired value by adding acids or bases.

The preferred film forming, water-soluble, polymers have a flocculation point of from 35° to 80° C. The flocculation point is determined by warming a 5% aqueous solution of the water-soluble, film-forming polymer in a flask provided with a reflux condenser at a heating rate of 10° C./5 min and determining, as the flocculation point, the temperature at which the majority of the polymer flocculates.

The water-soluble, film-forming polymer is preferably employed in an amount of from 5 to 95% by weight, based on the total weight of compound to be encapsulated and water-soluble polymer in the dry powder.

The water-soluble, film-forming polymers having a flocculation point of from 20° to 98° C. are preferably cellulose ethers having an average degree of substitution (DS) of less than 3. More preferably the cellulose ethers are methylhydroxyethylcellulose ethers or methylcellulose ethers having an average degree of substitution (DS) of in each case from 1.0 to 2.5; methylhydroxypropylcellulose ethers having an average degree of substitution (DS) of from 1.0 to 2.5 and containing from 20 to 30 mol % of methoxy groups and containing from 5 to 10 mol % of hydroxy propyl groups; hydroxypropylcellulose ethers having an average degree of substitution (DS) of less than 3. Preference is also given to polyvinyl alcohols having a hydrolysis number of from 230 to 450.

The water-soluble, film-forming polymers may be employed individually or in mixtures in the above amounts. The mixtures are prepared by known processes. For example, it is possible either to emulsify the compound to be encapsulated or the mixture to be encapsulated into the aqueous polymer solution or, conversely, to emulsify the aqueous polymer solution into the compound to be encapsulated or the mixture to be encapsulated. However, it is also possible to mix the water-soluble polymer into the compound to be encapsulated or the mixture to be encapsulated and to meter the water into this mixture with vigorous stirring.

It is also possible to employ water-soluble, film-forming polymers which do not have a flocculation point in the range of from 20° to 98° C. so long as such a flocculation point is produced in the aqueous mixture to be dried by addition of suitable additives, for example salts, inert solvents, acids or bases. Examples of polymers of this type are fully or partially hydrolyzed polyvinyl acetates and copolymers thereof with, for example, ethylene, propylene, other vinyl esters, with acrylic or methacrylic acrylic acid and derivatives thereof or dicarboxylic acids and derivatives thereof.

Further examples are polyvinylpyrrolidones, polyoxazolines, starch and starch derivatives, polyureas, polyurethanes, polyethers, polyamides, polyesters, polycarbonates; albumin, such as casein, gelatin and vegetable albumin, such as, for example, soya bean or maize proteins; modified polysaccharides, such as pullulan, pectin, alginates, laminarin and xanthan.

Examples of suitable salts are NaCl, $Na_2SO_4$ or $CaCl_2$. Also suitable are salts of carboxylic acids, for example Na acetate or ammonium acetate; sulphates, such as ammonium sulphate, sodium sulphate, potassium sulphate, iron(III) sulphate or aluminum sulphate or alum; carbonates, such as soda or sodium bicarbonate; borax, aluminium triformate, sodium aluminate, phosphates or the salts of tannic acid. Suitable inert solvents for adjusting the flocculation point are aliphatic alcohols, such as ethanol, butanol or diglycol; esters, such as, for example, glycol monoacetate or glycol diacetate; aliphatic ketones, such as acetone or methyl ethyl ketone. Examples of suitable acids are formic acid, acetic acid, propionic acid or hydrochloric acid. Examples of suitable bases are alkali metal hydroxides, ammonia or amines.

The amounts added in order to adjust the flocculation point to the desired value depend principally on the nature of the water-soluble polymer and of the added substance and are in general between 0.1 and 10.0% by weight, based on the water phase in the aqueous mixture to be dried. The water-soluble, film-forming polymers are preferably dissolved in an aqueous hydrochloric acid solution, the solvent/water mixture or the acidic or basic water phase and then employed to prepare the mixtures. However, it is also possible to add the salts, solvents, acids or bases to the finished mixture.

In addition to the compound to be encapsulated or the mixture to be encapsulated and the water-soluble, film-forming polymer, other additives may, if desired, also be present in the aqueous mixture to be dried. Examples of such additives are water-miscible solvents, such as diacetone alcohol, water-immiscible solvents, such as xylenes, fungicides, soluble dyes, pigments, ionogenic or nonionogenic emulsifiers, condensation catalysts, fillers and antiblocking agents. A suitable filler or antiblocking agent having a surface area of at least 50 $m^2/g$ is, for example, pyrogenically produced silicon dioxide. Examples of fillers or antiblocking agents having a surface area of less than 50 $m^2/g$ are chalk powder, needle-shaped calcium carbonate and quartz sand.

The fillers and antiblocking agents are preferably added in an amount of from 0.5 to 20% by weight, and more preferably from 1.0 to 10.0% by weight, based on the amount of compound to be encapsulated or mixture to be encapsulated. If desired, the fillers and antiblocking agents may have been rendered hydrophobic; for example by treatment with hexamethyldisiloxane.

The water content of the aqueous mixture to be dried is set at such a level that it is from 30 to 95% by weight and more preferably from 60 to 90% by weight, based on the total weight of the mixture to be dried.

The microencapsulation is carried out by thin-layer drying, where the water and any solvent present in the mixture evaporates on contact with a heated surface, onto which, in addition, a stream of inert gas or air can be fed. Preferably, the aqueous mixture is applied to the heated surface as a uniform film. After the drying operation, the microencapsulated compound or the encapsulated mixture is removed by a scraper, knife or device with an appropriate action.

The drying preferably takes place by roll drying. Any known equipment for roll drying can be employed, for example single-roll driers, double-roll driers, two-roll driers or two-stage roll driers. The transfer of the emulsion to be dried depends on the consistency of the emulsion and on the type of roll drier used. Thus, there are single-roll driers (immersed-roll driers) in which the emulsion is moved over the heated roll by immersion; the emulsion can be sprayed onto the heated roll or, if it is a paste-like material, it can be applied onto the roll from above. Double-roll driers have two forward-rotating drying rolls mounted with a relatively large separation and between which the emulsion is fed. In two-roll driers, the two drying rolls are mounted at a short distance from one another and rotate in a downward direction. A further example of a drier which operates on the principle of thin-layer drying is the vacuum roll drier.

It is essential that thin-layer drying take place in a temperature range about the flocculation point of the water-soluble polymer in the mixture. The temperature can be between 60° and 250° C. The temperature of the drying roll is usually from 60° to 130° C., preferably between 80° and 115° C. If very high-boiling products are to be encapsulated, the temperature can also be between 200° and 250° C. The speed of rotation of the drying roll is usually set so that the residence time on the roll is sufficient to ensure adequate drying. By changing the speed of rotation of the roll/rolls and, if roll driers having an application roll are used, by changing the distance of the application roll from the drying roll, the drying conditions can be varied within prespecified limits and thus optimized with respect to the particular mixture. The dry product is removed from the drying roll using a scraper.

Surprisingly, in spite of the shear forces occurring during the thin-layer drying, the capsule wall is not damaged during the process of this invention. Thus, microencapsulated flakes or powders are obtained using significantly less expensive agents than in the previously known spray-drying processes.

The above mentioned additives, in particular fungicides, dyes, pigments, condensation catalysts, fillers and antiblocking agents, can of course also be admixed with the flake-form or pulverulent dry product after the thin-layer drying.

The microencapsulated flakes or powders of organosilicon compounds which are obtained by means of the process of this invention can be used in the dry state, slurried in water or redispersed in water, as additives to loam, cement, gypsum, plaster, concrete, for the production of sand-lime bricks and for the preparation of paints. Further possible uses include imparting hydrophobic property surfaces of bulk materials, use as antifoaming agents in aqueous systems, for example for the surface modification of plastics and for the stabilization of foams. The organosilicon compounds encapsulated according to this invention are especially useful medicaments, in particular as antiflatulents.

The process is also suitable, inter alia, for the microencapsulation of fragrances, plasticisers, flame-proofing agents, crop-protection agents, catalysts, adhesion promoters and organic hydrophobic agents, drugs, herbicides, food additives and dyestuffs.

The examples below are intended to further illustrate the process of this invention:

EXAMPLE 1

An emulsion containing 1000 g of Trasil (methylsilicone resin, commercial product from Wacker-Chemie GmbH) in 2000 g of a solution of 100 g of a methylhydroxypropylcellulose having an average degree of substitution of about 1.8 and having a flocculation point of from 50° to 55° C. (Methocel A 15 from Dow Chemical) was dried on a roll drier at a roll temperature of 100° C. The product was obtained in the form of small flakes which were readily redispersible in water. A 1:1 mixture with a finely divided CaCO$_3$ (Socal U1 from Solvay), which was a very readily free-flowing powder, was successfully employed to render gypsum hydrophobic.

EXAMPLE 2

An emulsion containing 200 g of dioctyl phthalate in 400 g of an aqueous solution of 20 g of methylcellulose (Thylose MH 50 from Hoechst) was dried at a roll temperature of 103° C. as in Example 1. The product was obtained in the form of a redispersible film which was fragile in the manner of glass. The film was comminuted in a discharge screw to form flakes.

EXAMPLE 3

An emulsion containing 160 g of sunflower oil in an aqueous solution of 40 g of Methocel A15 from Dow Chemical in 1600 g of water was dried on a roll drier at a roll temperature of 103° C. A redispersible, glassy, fragile film was obtained which broke down in the discharge screw to give flakes.

EXAMPLE 4

About 160 g of Majatol$^R$ from Wacker-Chemie GmbH (2,2-dimethyl-3-(3-methylphenyl-)-propanol and 10 g of HDX V15 (highly dispersed silica from Wacker-Chemie) were emulsified in a solution of 40 g of Methocel A15 and 1600 g of water and dried in a roll drier as in Example 3. A redispersible, glassy film was obtained which was comminuted in the discharge screw to give a powder.

EXAMPLE 5

About 200 g of solid resin MK (silicone resin from Wacker-Chemie) were dissolved in 300 g of trichloroethylene and emulsified in a solution of 40 g of Methocel A15 and 1600 g of water and dried as in Example 3. A redispersible, free-flowing powder was obtained.

EXAMPLE 6

An emulsion containing 400 g of methyl resin 80 (approximately 55 to 58% silicone resin solution in toluene from Wacker-Chemie) in 40 g of Methocel A15 and 1600 g of water were dried as in Example 3. A redispersible powder was obtained.

EXAMPLE 7

About 400 g of REN 82 (silicone resin from Wacker-Chemie) in the form of a 50% toluene solution were emulsified in 40 g of Methocel A15 and 1600 g of water and dried as described in Example 3. A redispersible film was obtained, which was comminuted in the discharge screw to give flakes.

EXAMPLE 8

An emulsion containing 76 g of Trasil, 20 g of isooctyl-trimethoxysilane and 4 g of HDK V15 (products from Wacker-Chemie) was emulsified in a solution containing 5 g of polyvinyl alcohol W25/140 (product from Wacker-Chemie) and 100 g of water. The resultant emulsion was mixed with a solution containing 15 g of Methocel A15 and 600 g of water and dried as in Example 3. A redispersible film was obtained, which was comminuted in the discharge screw to give flakes.

EXAMPLE 9

About 200 g of paraffin were emulsified at 80° C. in a solution containing 46 g of polyvinyl alcohol W25/100 (product from Wacker-Chemie) and 1400 g of water, cooled to room temperature and mixed with a solution containing 10 g of Na$_2$SO$_4$, 90 g of water and 100 g of 10% aqueous dispersion of HDK V15 (product from Wacker-Chemie). This mixture was dried as described in Example 3. A redispersible powder was obtained.

EXAMPLE 10

A mixture containing 100 parts by weight of water, 25 parts by weight of an organopolysiloxane composed of 93% by weight of dimethylpolysiloxane (Brookfield viscosity 8000 cps) activated with 7% by weight of silica and methylsilica (S 132 from Wacker-Chemie GmbH) and 2.5 parts by weight of a methyl-hydroxypropylcellulose having an average degree of substitution (DS) of about 1.8 and a flocculation point of from 50° to 55° C. (Methocel A15 from Dow Chemical) was dried on a roll drier at a temperature of 100° C. The product was obtained as a thin, fragile film. Grinding to a powder was possible without problems and the film was readily redispersible in water.

EXAMPLE 11

A mixture containing 100 parts by weight of water, 20 parts by weight of an organopolysiloxane composed of (SiHCH$_3$—O) units in the chain and Si(CH$_3$)$_3$ terminal groups and having a kinematic viscosity of from 2000 to 4000 mm$^2$·/s at 25° C. (H-Siloxan from Wacker-Chemie GmbH) and 2.0 parts by weight of a methylhydroxypropylcellulose having an average degree of substitution (DS) of about 1.8 and having a flocculation point of from 50° to 55° C. (Methocel A15 from Dow Chemical) was dried on a roll drier at a temperature of 105° C. The product was obtained in the form of chips which readily broke down to form powders and were readily redispersible in water.

EXAMPLE 12

A mixture containing 100 parts by weight of water, 20 parts by weight of a dimethylpolysiloxane containing dimethylvinyl terminal groups and 2.5 parts by weight of a methylhydroxypropylcellulose having an average degree of substitution (DS) of about 1.8 and having a flocculation point of from 50° to 55° C. (Methocel A15 from Dow Chemical) was dried on a roll drier at a temperature of 110° C. The product was obtained in the form of fine flakes which readily broke down and were readily redispersible in water.

EXAMPLE 13

A mixture containing 100 parts by weight of water, 20 parts by weight of a phenylmethylorganopolysiloxane having a viscosity of about 100 mm$^2$·/s (silicone oil AP 100 from Wacker-Chemie GmbH) and 2.0 parts by weight of a partially hydrolyzed polyvinyl acetate having a degree of hydrolysis of about 77 mol %, a Höppler viscosity of 6.0 mPa·s in 4% aqueous solution at 20° C. (Polyviol M06/223 from Wacker-Chemie GmbH) and 0.8 parts by weight of Na$_2$SO$_4$, in which the solution has a flocculation point of about 60° C., was dried on a roll drier at a temperature of 110° C. The product was obtained in the form of fine flakes which were readily grindable to form powders and were readily redispersible in water.

EXAMPLE 14

A mixture containing 100 parts by weight of water, 20 parts by weight of a dimethylpolysiloxane having a kinematic viscosity of 100000 mm$^2$·/s and 2 parts by weight of a methylhydroxypropylcellulose having an average degree of substitution (DS) of about 1.8 and having a flocculation point of from 50° to 55° C. (Methocel A15 from Dow Chemical) was applied to a glass plate heated to 120° C., and dried. The product was obtained in the form of relatively large chunks which were easy to comminute.

What is claimed is:

1. A process for the preparation of microencapsulated flakes or powders, comprising;

A. preparing an aqueous mixture consisting essentially of,
  i. a water insoluble, non-thermoplastic compound having a boiling point of at least 150° C. under standard conditions, and
  ii. a water-soluble, film-forming polymer, wherein the film-forming polymer has a flocculation point of from 20° C. to 98° C. or the flocculation point is adjustable from 20° C. to 98° C.

where the water insoluble, non-thermoplastic compound is at most 95% by weight of the dry weight of the water insoluble, non-thermoplastic compound and the water-soluble, film-forming polymer, B. microencapsulating the water insoluble, non-thermoplastic compound in the water soluble, film-forming polymer by drying the mixture in a thin-layer, at a temperature above the flocculation point of the water soluble, film-forming polymer, and C. processing the dried thin-layer to obtain a flake or a powder.

2. The process of claim 1, wherein the water insoluble, non-thermoplastic compound is an organopolysiloxane of the formula $R^3R_2SiO(SiR_2O)_nSiR_2R^3$, in which the radical R is a monovalent hydrocarbon radical, which may be, substituted with a substituent which is optionally inert towards water at the drying conditions, or hydrogen, with the proviso that at least one hydrocarbon radical is also bonded to each silicon atom to which a hydrogen atom is bonded, and $R^3$ is selected from the group consisting of R and $-OR^2$, where $R^2$ is selected from the group consisting of a hydrogen atom and a hydrocarbon radical having from 1 to 18 carbon atoms and n is 0 or an integer.

3. The process of claim 2, wherein the organopolysiloxanes are selected from the group consisting of dimethylpolysiloxanes which are endblocked with trimethylsiloxy groups, dimethylpolysiloxanes which are endblocked by dimethylvinylsiloxy groups, methylhydrogenpolysiloxanes which are endblocked with trimethylsiloxy groups, copolymers containing dimethylsiloxane and methylhydrogensiloxane units which are endblocked with trimethylsiloxy groups, dimethylpolysiloxanes which are endblocked with dimethyl-H-siloxy groups, and dimethylpolysiloxanes containing one Si-bonded hydroxyl group in each of the terminal units.

4. The process of claim 1, wherein the water insoluble, non-thermoplastic compound is a fluid at a temperature below 80° C. and is selected from the group consisting of an organic and inorganic compound which is insoluble or slightly soluble in water, but does not react or reacts very slowly with water under the process conditions and has a boiling point of at least 150° C. at 1020 hPa (abs.).

5. The process of claim 4, wherein the water insoluble, non-thermoplastic compound is selected from the group consisting of paraffins, terpenes, fragrances, halogenated hydrocarbons, esters, plasticizers, ethers, alcohols, amines, acids, herbicides, food additives, dyestuffs, di- and polysilanes, carbosilanes, siloxane copolymers and polyethyl silicates.

* * * * *

UNITED STATES PATENT AND TRADEMARK OFFICE
CERTIFICATE OF CORRECTION

PATENT NO : 5,863,862
DATED : January 26, 1999
INVENTOR(S) : Herbert Eck et al.

It is certified that error appears in the above-identified patent and that said Letters Patent is hereby corrected as shown below:

Column 10, Line 15, Claim 3, after "groups" insert --dimethyl-γ-aminopropyl-siloxy groups, dimethyl-γ-hydroxypropyl-siloxy groups, dimethyl-H-siloxy groups--.

Signed and Sealed this

Twelfth Day of October, 1999

*Attest:*

Q. TODD DICKINSON

*Attesting Officer*  *Acting Commissioner of Patents and Trademarks*